United States Patent
Agarwal

(10) Patent No.: US 7,689,634 B2
(45) Date of Patent: Mar. 30, 2010

(54) FLEXIBLE APPROACH TO STORE ATTRIBUTE INFORMATION (META-DATA) RELATED TO FILES OF A FILE SYSTEM

(75) Inventor: Vivek Agarwal, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 287 days.

(21) Appl. No.: 11/163,819

(22) Filed: Nov. 1, 2005

(65) Prior Publication Data
US 2007/0067367 A1    Mar. 22, 2007

(30) Foreign Application Priority Data
Sep. 16, 2005  (IN) .................. 1316/CHE/2005

(51) Int. Cl.
*G06F 17/30* (2006.01)
*G06F 12/00* (2006.01)

(52) U.S. Cl. .................................................. 707/822
(58) Field of Classification Search .................. 707/100
See application file for complete search history.

(56) References Cited

U.S. PATENT DOCUMENTS

| | | | |
|---|---|---|---|
| 5,819,275 A * | 10/1998 | Badger et al. | 707/100 |
| 6,119,118 A * | 9/2000 | Kain et al. | 707/10 |
| 6,493,712 B1 * | 12/2002 | Karp et al. | 707/6 |
| 6,535,932 B1 * | 3/2003 | Endoh et al. | 710/7 |
| 6,691,127 B1 * | 2/2004 | Bauer et al. | 707/102 |
| 6,718,377 B1 * | 4/2004 | Bischoff et al. | 709/223 |
| 6,748,388 B1 * | 6/2004 | Kasamsetty et al. | 707/10 |
| 2001/0037337 A1 * | 11/2001 | Maier et al. | 707/101 |
| 2002/0116370 A1 * | 8/2002 | Harvey | 707/3 |
| 2003/0037311 A1 * | 2/2003 | Busfield | 717/115 |
| 2003/0191734 A1 * | 10/2003 | Voigt | 707/1 |
| 2005/0114381 A1 * | 5/2005 | Borthakur et al. | 707/102 |
| 2006/0112108 A1 * | 5/2006 | Eklund et al. | 707/100 |

* cited by examiner

Primary Examiner—John R. Cottingham
Assistant Examiner—Nicholas E Allen
(74) Attorney, Agent, or Firm—Narendra Reddy Thappeta

(57) ABSTRACT

A file system designed according to a convention which permits the addition of new attributes (potentially of new types not defined earlier) for any desired set of files. In one embodiment, addition of an attribute for a file requires rewriting of attributes (of other files) stored following the added new attribute. In an alternative embodiment, the convention permits an attribute to point to another location at which the storing of new attributes is continued.

18 Claims, 6 Drawing Sheets

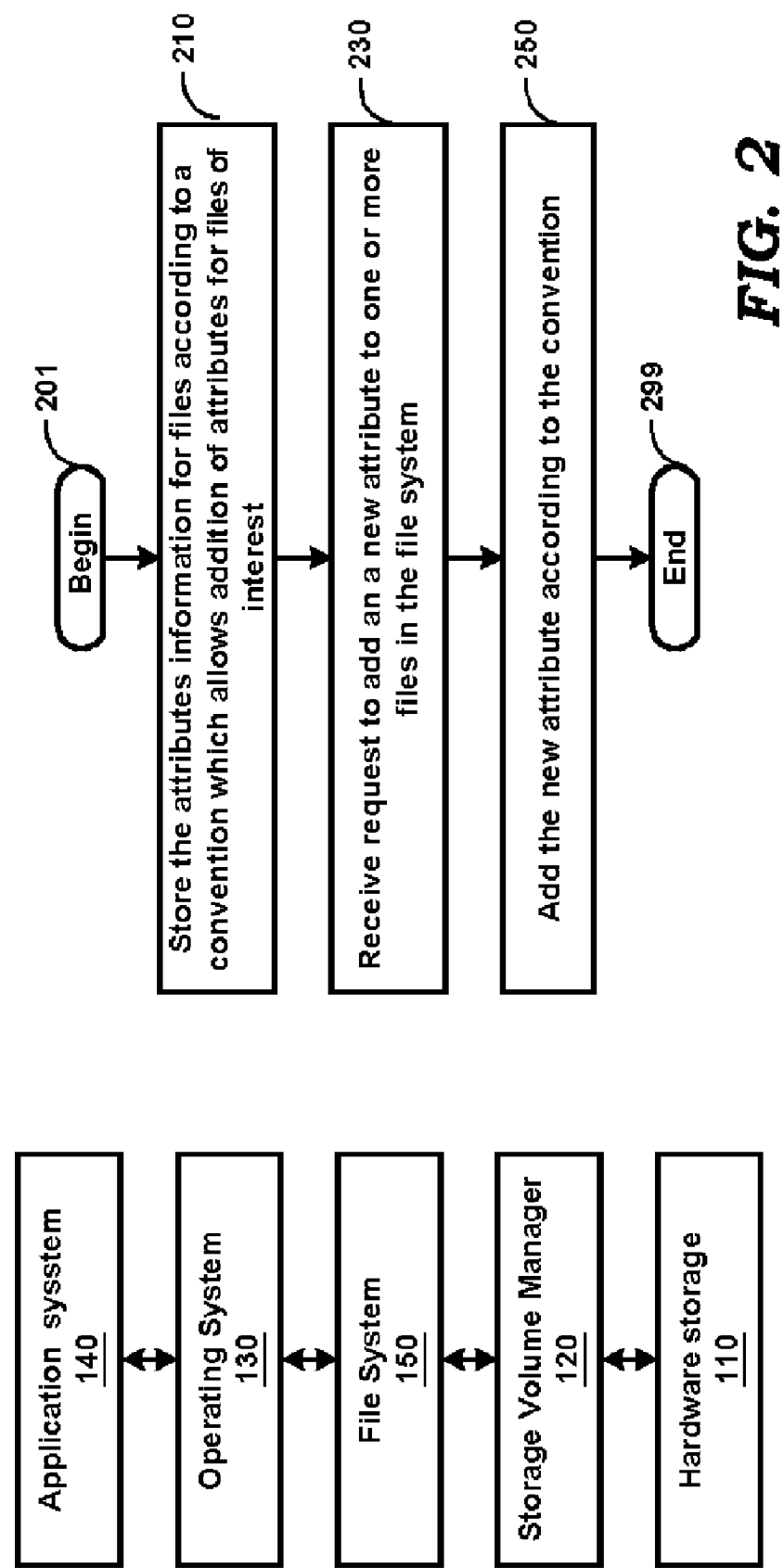

| Valid Flag 305 | Attribute Length 301 | Name 302 | Attribute value 303 |

(Row 1): File 1 Identifier 410-A | Data storage Identifier 410-B | Attribute 1 410-C | Separator 420 | Attribute 2 410-D | Separator 420 | Attribute 3 410-E | End of Row Separator 430 | File 2 Identifier 420-A | Data storage Identifier 420-B | Attribute 4 420-C (Row 2): Separator 420 | Attribute 2 420-D | End of Row Separator 440 | File 3 Identifier 430-A | Data storage Identifier 430-B | Attribute 3 430-C | Separator 420 | Attribute 5 430-D | End of Row Separator 470

| Valid Flag 305 | Continuation flag 606 | Attribute Length 301 | Name 302 | Attribute value 303 |
|---|---|---|---|---|

FIG. 6A

| Valid Flag 305 | Continuation flag 606 | Attribute storage identifer Length 608 | Attribute storage identifer Value 607 |
|---|---|---|---|

FIG. 6B

FLEXIBLE APPROACH TO STORE ATTRIBUTE INFORMATION (META-DATA) RELATED TO FILES OF A FILE SYSTEM

RELATED APPLICATIONS

The present application is related to and claims priority from the co-pending India Patent Application entitled, "Flexible Approach to Store Attribute Information (Meta-data) Related to Files of a File System", Serial Number: 1316/CHE/2005, Filed: 16 Sep. 2005, naming the same inventors as in the subject patent application.

BACKGROUND OF THE INVENTION

1. Field of the Invention

The present invention relates to a file systems used for storing data in digital processing systems, and more specifically to a flexible approach to store attribute information (meta-data) related to files of a file system.

2. Related Art

A file system generally provides for storing and retrieving (in general, accessing) files in/from a storage system (e.g., hard drive). Examples of such file systems include FAT (File Allocation Table) based file system, System5FileSystem (S5fs), etc., well known in the relevant arts.

There are generally various attributes associated with the files of a file system. Each attribute provides data defining the corresponding property of a file maintained by the file system. Examples of the attributes include a directory name/path at which the file is located, the name of the file, size/volume of the file, locations where the data corresponding to each of the files is stored, etc.

In a prior approach, a file system supports a fixed number of attributes, that too of pre-specified types. In general, these attributes are set to corresponding values (including possibly no character, if the value is unavailable at that time) when a file is created, and the values are updated appropriately over time.

However, there are often situations when it is desirable to add attributes, possibly of a type not previously supported in the file system. For example, it may be desirable to store attribute information related to backup time for some type of files, but such need may not exist for other files. In addition, such a need to store backup time may be recognized after the design/installation of the file system, and the prior approach noted above may not support the addition of such new attribute types (let alone attributes of pre-specified types).

What is therefore needed is a flexible approach to store attribute information (meta-data) related to files of a file system.

BRIEF DESCRIPTION OF THE DRAWINGS

The present invention will be described with reference to the accompanying drawings briefly described below.

FIG. 1 is a block diagram of an example environment in which various aspects of the present invention can be implemented.

FIG. 2 is a flowchart illustrating the manner in attributes for files are added according to various aspects of the present invention.

FIG. 3 depicts the format used for storing information related to each attribute in an embodiment of the present invention.

FIG. 4 depicts the manner in which attributes for various files (after creation is complete) are stored in consecutive bit positions of a hardware storage.

FIGS. 6A and 6B illustrate the format for storing information related to each attribute in an alternative embodiment of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

Figure 5:
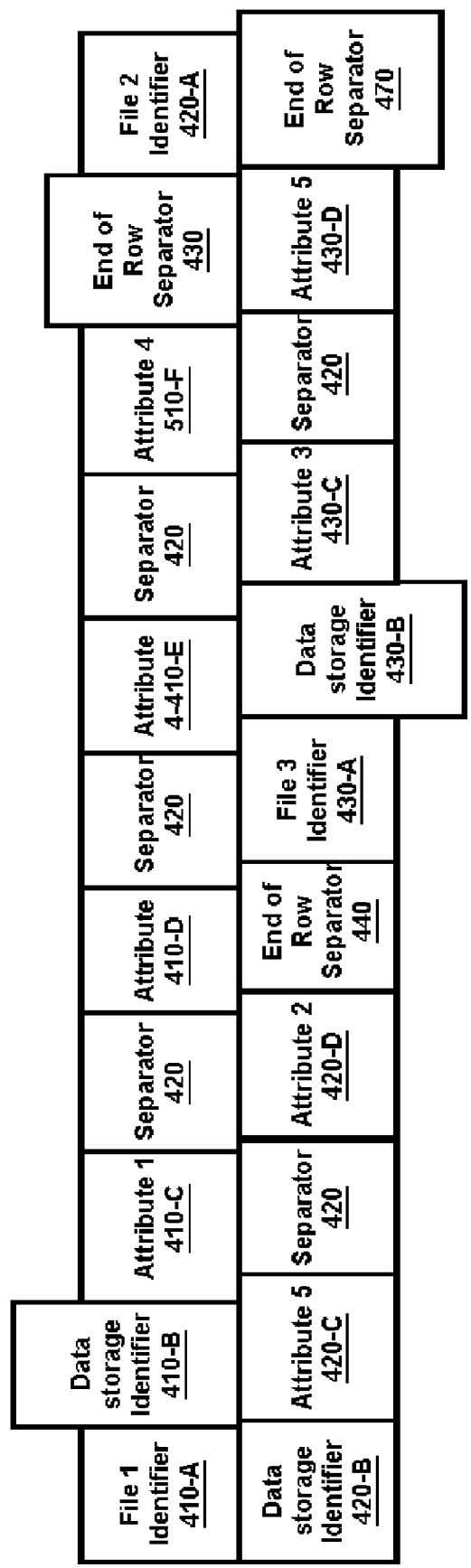
FIG. 5 illustrates the manner in which the attribute information related to several files is rewritten to facilitate addition of an attribute for a file in an embodiment of the present invention.

An aspect of the present invention stores attribute information for the files in a file system according to a convention, which allows addition of attributes for a file of interest. Attributes are added according to the convention when a request to add a new attribute to the files of interest is received. Thus, a file may be created with a first set of attributes, and if a request to add another attribute is received after such creation, such an attribute is added.

Another aspect of the present invention enables such added attributes to be of a new type. Such a feature is facilitated by using a convention which provides a field for storing the attribute type (i.e., the field is defined to be self-encoding).

One more aspect of the present invention allows attributes to be added without substantial processing requirements by providing a flag in the attributes to indicate whether the attribute information is continued in other portions of a storage system. Thus, in case the attribute information is stored in sequential locations of a memory storage, the flag can be conveniently used to avoid overwriting or reorganization of the entire data to facilitate addition/removal of an attribute.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example System

FIG. 1 is a block diagram illustrating an example system in which various aspects of the present invention can be implemented. Digital processing system 100 is shown containing hardware storage 110, storage volume manager 120, operating system 130, application system 140 and file system 150. Each block of FIG. 1 is described below in further detail.

Application system 140 generally contains various user applications requiring access to corresponding files. Operating system 130 provides the necessary interface between application system 140 and file system 130 (as well as other resources contained in digital processing system 100). Operating system 130 receives commands from application system 130, and may further interface with file system 150 if the command received is for file requests.

Hardware storage 110 provides the physical medium on which data is stored. The storage may be organized as different logical units (e.g., sectors/cylinders, etc.) depending on the technology using which hardware storage 110 is implemented. The data stored in hardware storage 110 includes the content data of each file, as well as various attribute information.

Storage volume manager 120 contains various drivers (software which issues appropriate commands to the hardware) to access data in hardware storage 110 based on the identifiers of the logical units. Storage volume manager 120 may shield file system 150 from several details of the underlying hardware storage.

File system 150 receives requests from application system 140 via operating system 130, and interfaces with storage volume manager 120 to process each request. Some of the requests relate to read/write of content of each file, and other requests may relate to attribute information. Various aspects of the present invention enable file system 150 to provide various features in relation to attributes, as described below in further detail.

3. Method

FIG. 2 is a flowchart illustrating the manner in which file system 150 may store attribute information for files in a file system according to various aspects of the present invention. The flowchart is described with respect to FIG. 1 merely for illustration. However, the approach(es) can be implemented in other systems/environments as well. The flowchart begins in step 201, in which control passes to step 210.

In step 210, file system 150 stores the attributes information for files according to a convention, which allows addition of attributes for each file of interest. An example convention is described in further detail in sections below.

In step 230, file system 150 receives a request to add a new attribute to one or more files in the file system. The new attribute can be of a pre-specified type or a new type, as also described below in further detail. The request generally needs to identify the attribute type and the value for the attribute sought to be added. An embodiment in sections below is used to illustrate how new attributes can be added for files of interest.

In step 250, file system 150 adds the new attribute according to the convention. Control passes to step 299, where the flowchart ends. Once the attribute is added, the corresponding attribute information may be retrieved and displayed in response to corresponding requests received from application system 140.

The approach described above can be implemented to add attributes using various conventions. The description is continued with an example convention using in which attributes of files can be stored and new attributes can be added (or removed) for files in a file system.

4. Example Convention Representation for Attributes

FIG. 3 represents an example convention used for storing each attribute associated with a file. According to the convention, each attribute contains sub-fields B valid flag 305, attribute length 301, name 302, and value 303. Each sub-field of the convention is described briefly below.

Valid flag 305 indicates whether the present field contains valid data. As described in further detail below, in case of removal, the valid flag is set to one value, and to another value to indicate valid data otherwise. Sub-field >Attribute Length 301' contains a value indicating the aggregate length of all the sub-fields together for the present attribute. Similarly, >Name 302' contains a value indicating the name (identifier) of the attribute and >Attribute Value 303' contains the value for the attribute.

Due to such a self-encoding convention (including the length and identifier), additional attributes (either of pre-specified types or new types) can be added to a file, as desired.

The description is continued with an illustration of how multiple attributes of corresponding files are stored in data storage 110. Each attribute is stored is according to the convention described above with respect to FIG. 3.

5. Storing Attributes

FIG. 4 illustrates the manner in which attributes associated with various files can be stored in hardware storage 110. In the Figure, the attributes are stored in successive bit positions in hardware storage 110. FIG. 4 is shown containing attributes stored for files identified by values stored in corresponding fields 'File 1 Identifier 410A', 'File 2 Identifier 420A' and 'File 3 Identifier 430A'. Each of the file identifiers can also be encoded/stored (as attributes) according to the convention of FIG. 3 described above.

As may be appreciated, attributes are separated by 'separator 420' (though potentially not required, due to the length sub-field 301) and the attribute information for files is separated from each other by 'End of Row Separator' as indicated by fields 430, 440 and 470.

Continuing with the description of attributes of each of the files of FIG. 4, the file identified by the corresponding value in 'File 1 Identifier 410A' is shown containing attributes (metadata) 'Attribute 1' (410C), 'Attribute 2' (410D), 'Attribute 3' (410C) with separator 420 separating each successive pair of attributes. As may be appreciated, 'Attribute 3 410E' is shown as the last attribute of the file since it is followed by the 'End of row Separator 430'.

'Data storage Identifier 410B' contains value(s), which indicate locations (start of blocks such as sectors) in hardware storage 110, from where attributes of the file may be retrieved. Alternatively, data storage identifier 410B may point to another location, which in turn contains the list of identifiers of the locations at which the file content is stored.

Continuing with the description of the attributes of the files, another file identified by (the corresponding value in) File 2 Identifier 420A also has similar associated fields. Thus, data storage identifier 420B identifies locations where the content for the file is stored, and the file is shown with additional meta data attributes 'Attribute 5—420C' and 'Attribute 2—420D'.

Attributes (Attribute 3—430C and 'Attribute 5—430D) of yet another file identified by the corresponding value in 'File 3 Identifier 430A' are also stored in Hardware storage 110 accordingly.

The description is continued with an illustration of how new attributes can be added to the files (of FIG. 4) and how the attributes of the files can be stored using various aspects of the present invention.

6. Addition of Attributes

FIG. 5 is used to illustrate the manner in which various additional attributes of files can be stored according to the convention in hardware storage 110. For conciseness, only attributes which are added new are described below, since the details of the other attributes have been described above with reference to FIG. 4.

As may be appreciated, a new attribute 'Attribute 4—410F' is shown added to the attributes of the file identified by the value in 'File 1 Identifier 410A'. A new sub-field 'separator 320' is also shown added to indicate a separator between the new attribute and attribute 3—310E. Attribute 4 410-F would have the corresponding valid flag sub-field set to valid value.

To facilitate such addition of one attribute, the entire set of attributes for several other files (after the point of insertion) may need to be rewritten at new bit positions since the attribute data is shown stored in consecutive bit positions of hardware storage 110. Thus, at least attributes for files 2 and 3 may be rewritten at new bit positions in hardware storage 110.

On the other hand, deletion of an attribute merely requires the corresponding valid flag (310) to be set to indicate invalid status.

Thus, using the approaches above, any desired attributes can be added only to some files of interest. The added attributes can be of new types also, since the attribute storage definition is defined to be self-encoding (with attribute identifier and length included) and file system 150 and operating system 130 need to designed to take advantage of such a feature.

However, addition of attributes may cause unacceptable high overhead due to the rewriting required for the attributes at least in bit position following the attribute sought to be added. An alternative convention which overcomes some of such disadvantages, is described below in further detail.

7. Alternative Convention

FIGS. 6A and 6B together depict an alternative convention used for storing attributes of a file. For conciseness, only the differences of FIGS. 6A/6B from the convention of FIG. 3, are described now. According to the representation, an additional flag entitled continuation flag 606 is added.

Continuation flag 606 indicates whether (upon a TRUE value) the metadata information is continued at some other block location (non-contiguous with previously stored attributes), and would be set to true only in case of the last attribute (which would point to such block location at which the metadata information is continued) in case of the existent of such continuation. Otherwise, continuation flag 606 is set to false.

Accordingly, FIG. 6A illustrates the convention when continuation flag 606 is set to 'FALSE' and FIG. 6B when continuation flag 606 is set to 'TRUE'. Various sub-fields of both the figures are described briefly below.

With respect to FIG. 6A, it should be observed that other than continuation flag 606 (set to a 'FALSE'), the convention is shown containing the same sub-fields as in FIG. 3 and hence the description is not repeated again for conciseness.

FIG. 6B contains sub-columns 'attribute storage identifier length 608' and 'attribute storage identifier value 607' in addition to valid flag 305 and continuation flag 606. Attribute storage identifier length 608 indicate an aggregate length of storage location needed to store all the sub-fields of the present attribute (of FIG. 6B). Attribute storage identifier value 607 indicates the specific bit position in hardware storage 110 (e.g., by way of the address of a block/sector) from where storing of additional attributes is continued.

The description is continued with an illustration of how additional attributes can be added according to the convention of FIGS. 6A and 6B without having to rewrite entire set of attributes of several other files in hardware storage 110.

8. Addition of an Attribute According to Alternative Convention

Figure 7:
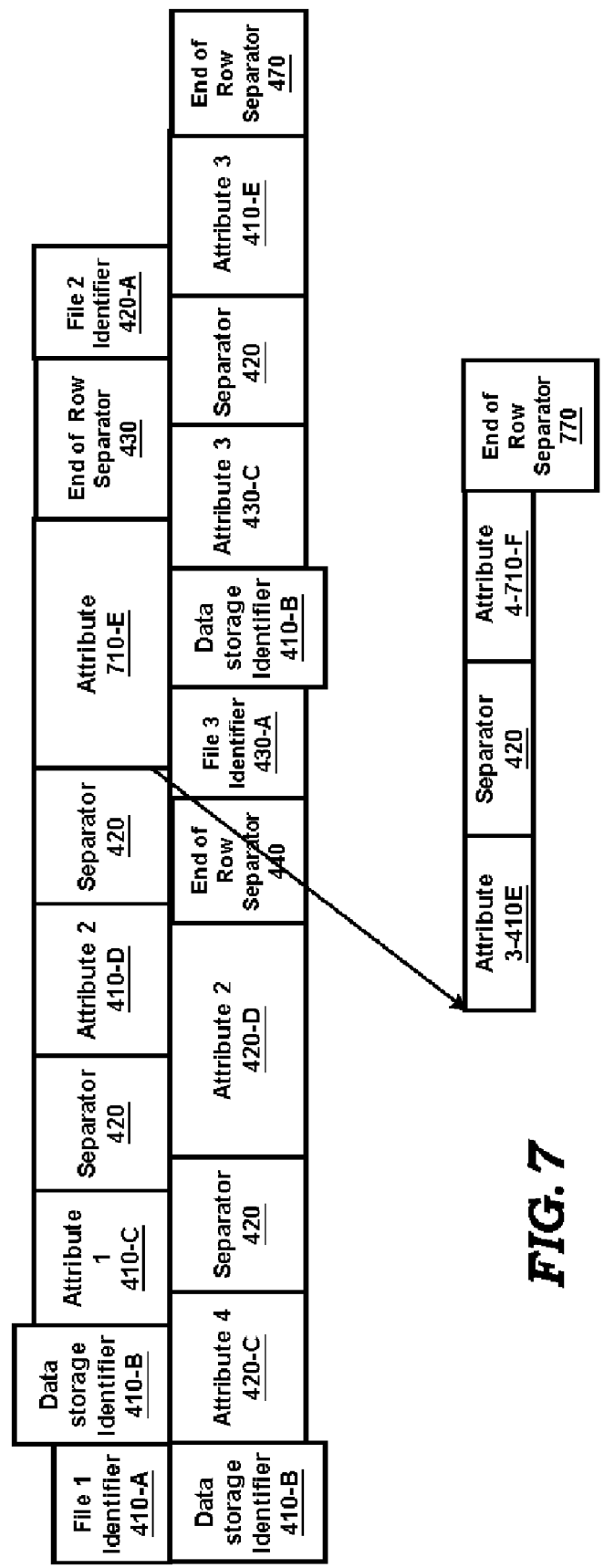
FIG. 7 illustrates the manner in which rewriting of attributes is avoided according to an aspect of the present invention.

FIG. 7 illustrates the manner in which various additional attributes of files can be stored according to the alternative convention of FIGS. 6A and 6B in hardware storage 110. For conciseness, it is assumed that a new attribute 'Attribute 4—710F' is to be added to the attributes of FIG. 4, and also that the attributes of FIG. 4 are already stored according to the convention of FIG. 6A (i.e., each attribute would contain continuation flag 606 set to false before the addition of attribute 4 710F).

FIG. 7 illustrates the status after a new attribute 'Attribute 4—710F' is added to the attributes of the file identified by the value in 'File 1 Identifier 410A'. To facilitate such addition, attribute 710E constructed according to the alternative convention of FIG. 6B (i.e., with a value of 'TRUE' for continuation flag 606), and is shown replacing 'attribute 3—410E'.

Attribute storage identifier value 607 of attribute 710-E would point to the specific location at which 'Attribute 3—410E' and 'attribute 4—710F' are stored. It should be appreciated that additional attributes for file 1 can be stored as a continuation to attribute 4—710F (by moving the end of row separator 770).

From the description above, it may be appreciated that the alternative convention of FIG. 6B facilitate addition of new attributes without having to re-write the entire set of attributes for several other files.

It should be understood that the features described above can be implemented using a desired combination of hardware, software and firmware, as suited for a specific situation. The description is continued with respect to an embodiment in which various features are operative by execution of software instructions in a digital computer system.

9. Digital Processing System

Figure 8:
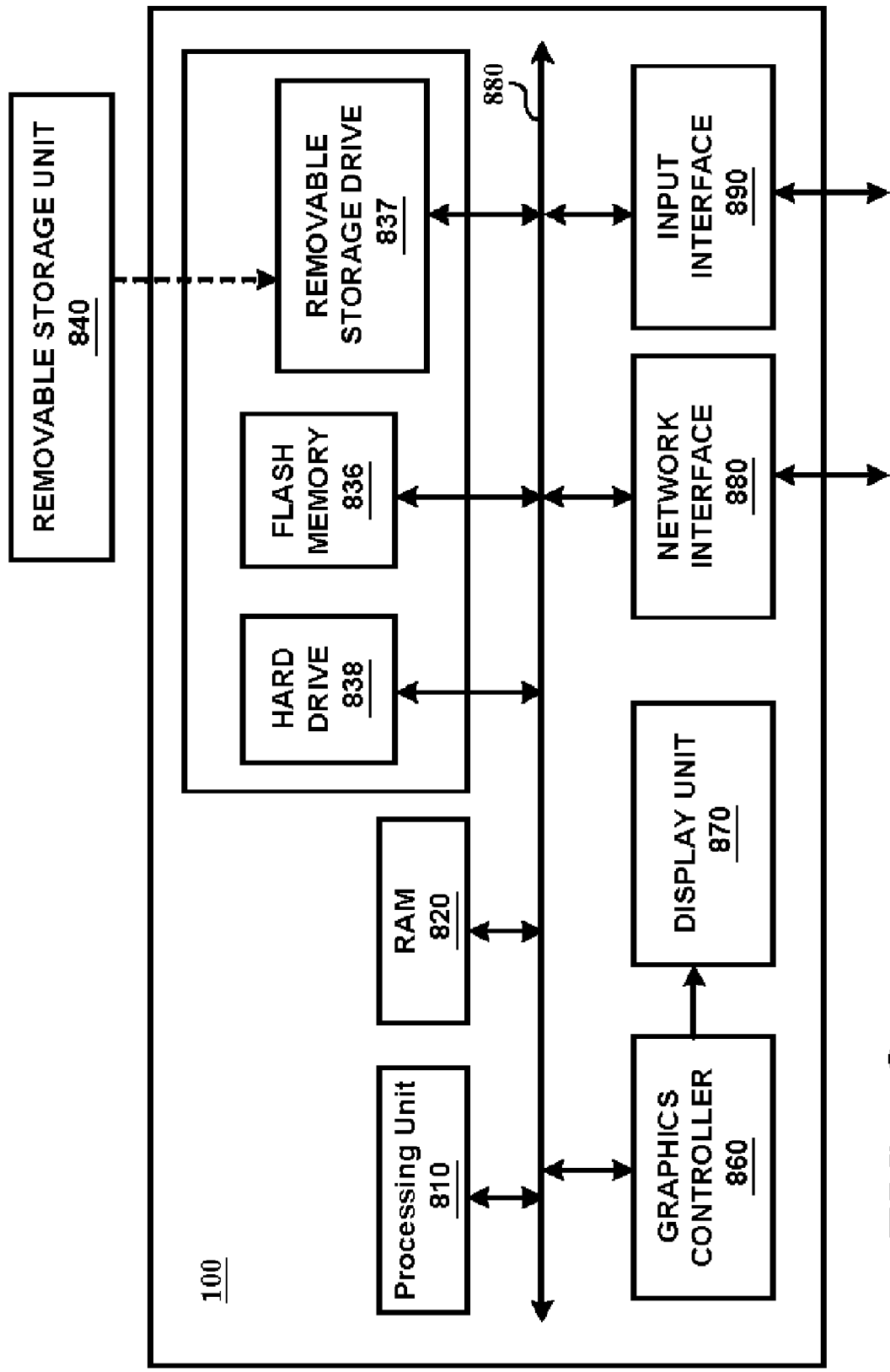
FIG. 8 is a block diagram illustrating an example embodiment in which various aspects of the present invention are operative when software instructions are executed.

FIG. 8 is a block diagram illustrating the details of digital processing system 100 in which various aspects of the present invention are operative by execution of appropriate software instructions. System 100 may contain one or more processors such as central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute the instructions stored in RAM 820 to provide several features of the present invention. CPU 810 may contain multiple processing units, with each processing unit potentially being designed for a specific task. Alternatively, CPU 810 may contain only a single general purpose processing unit. RAM 820 may receive instructions from secondary memory 830 using communication path 850.

Graphics controller 860 generates display signals (e.g., in RGB format) to display unit 870 based on data/instructions received from CPU 810. Display unit 870 contains a display screen to display the images defined by the display signals.

Input interface 890 may correspond to a key-board and/or mouse. Network interface 880 provides connectivity to a network (e.g., using Internet Protocol).

Secondary memory 830 may contain hard drive 835 (providing for hardware storage 110, as well), flash memory 836 and removable storage drive 837. Secondary memory 830 may store the data and software instructions (e.g., methods instantiated by each of client system), which enable system 100 to provide several features in accordance with the present invention. Some or all of the data and instructions may be provided on removable storage unit 840, and the data and instructions may be read and provided by removable storage drive 837 to CPU 810. Floppy drive, magnetic tape drive, CD-ROM drive, DVD Drive, Flash memory, removable memory chip (PCMCIA Card, EPROM) are examples of such removable storage drive 837.

Removable storage unit 840 may be implemented using medium and storage format compatible with removable storage drive 837 such that removable storage drive 837 can read the data and instructions. Thus, removable storage unit 840 includes a computer readable storage medium having stored therein computer software and/or data.

In this document, the term "computer program product" is used to generally refer to removable storage unit 840 or hard disk installed in hard drive 835. These computer program products are means for providing software to system 800. CPU 810 may retrieve the software instructions, and execute the instructions to provide various features of the present invention described above.

10. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents. Also, the various aspects, features, components and/or embodiments of the present invention described above may be embodied singly or in any combination in a data storage system such as a database system and a data warehouse system.

What is claimed is:

1. A method of maintaining attribute information for a plurality of files, said method comprising:
   storing on a hardware storage said plurality of files in a file system, said file system providing for a first set of fields and a second set of fields corresponding to each of said plurality of files, said first set of fields identifying locations on said hardware storage to store content corresponding to each file and said second set of fields storing a set of attributes corresponding to each file according to a convention which permits addition of new types of attributes for files of interest, wherein each attribute in said set of attributes is contained in a set of attribute types currently supported by said file system,
   wherein said storing stores a continuation flag for each attribute in a corresponding sub-field on said hardware storage according to said convention, wherein said continuation flag has a first value to indicate that the attributes information for a corresponding file are continued at some other location which is not stored continuous with the attributes of the corresponding file, said continuation flag having a second value otherwise,
   wherein a first file is stored associated with a first set of attributes according to said convention upon creation of said first file, wherein said first file is contained in said plurality of files and said first set of attributes is contained in said plurality of sets of attributes, wherein each of said first set of attributes has the continuation flag set to said second value;
   receiving, after said storing, a first attribute of a new attribute type for said first file, wherein said first attribute is not contained in said first set of attributes and said new attribute type is not contained in said set of attribute types upon creation of said first file; and
   adding said first attribute of said new attribute type to said second set of fields corresponding to said first file in said file system on said hardware storage according to said convention,
   whereby said file system on said hardware storage permits addition of new types of attributes not previously supported for files in said file system.

2. The method of claim 1, wherein said convention comprises storing on said hardware storage, for each attribute whose said continuation flag is set to said second value, sub-fields indicating a type of the attribute, a length of said attribute and a value of said attribute.

3. The method of claim 2, wherein said adding comprises overwriting some of said of attributes stored in said second set of fields corresponding to said first file on said hardware storage to facilitate storing of said first attribute.

4. The method of claim 1, wherein said convention and said adding together comprises:
   providing on said hardware storage an end of row separator and a second attribute as a last attribute before said end of row separator in a sequence of attributes for said first file, said sequence of attributes being contained in said set of attributes corresponding to said first file, said second attribute containing said sub-field to store said continuation flag and a second sub-field to store an address location on said hardware storage; and
   if said first attribute is stored at some other location not contiguous with said sequence of attributes,
   setting said continuation flag to said first value and said second sub-field to an address of another location on said hardware storage where said first attribute is stored.

5. The method of claim 2, wherein said convention comprises storing on said hardware storage a valid flag with each of said attributes, wherein said valid flag indicates whether the corresponding attribute has valid data.

6. The method of claim 5, further comprising:
   receiving a request to delete a second attribute for said first file, wherein said second attribute is contained in said set of attributes corresponding to said first file; and
   setting said valid flag of said second attribute to indicate that the corresponding bits do not contain valid data.

7. A computer readable medium carrying one or more sequences of instructions causing a server to maintain attribute information for a plurality of files contained in a file system, wherein execution of said one or more sequences of instructions by one or more processors contained in said server causes said server to perform the actions of:
   storing on a hardware storage said plurality of files and a corresponding one of a plurality of sets of attributes corresponding to each of said plurality of files according to a convention which permits addition of new types of attributes for files of interest, wherein each attribute in said plurality of sets of attributes is contained in a set of attribute types currently supported by said file system,
   wherein said storing stores a continuation flag for each attribute in a corresponding sub-field on said hardware storage according to said convention, wherein said continuation flag has a first value to indicate that the attributes information for a corresponding file are continued at some other location which is not stored continuous with the attributes of the corresponding file, said continuation flag having a second value otherwise, wherein a first file is stored associated with a first set of attributes according to said convention upon creation of said first file, wherein said first file is contained in said plurality of files and said first set of attributes is contained in said plurality of sets of attributes, wherein each of said first set of attributes has the continuation flag set to said second value;

receiving, after said storing, a first attribute of a new attribute type for said first file, wherein said first attribute is not contained in said first set of attributes and said new attribute type is not contained in said set of attribute types upon creation of said first file; and adding, on said hardware storage said first attribute of said new attribute type to said first file according to said convention, whereby said file system on said hardware storage permits addition of new types of attributes not previously supported for files in said file system.

8. The computer readable medium of claim 7, wherein said convention comprises storing on said hardware storage, for each attribute whose said continuation flag is set to said second value, sub-fields indicating a type of the attribute, a length of said attribute and a value of said attribute.

9. The computer readable medium of claim 8, wherein said adding comprises overwriting some of said plurality of sets of attributes on said hardware storage to facilitate storing of said first attribute.

10. The computer readable medium of claim 7, wherein said convention and said adding together comprises:

providing on said hardware storage an end of row separator and a second attribute as a last attribute before said end of row separator in a sequence of attributes for said first file, said sequence of attributes being contained in said set of attributes corresponding to said first file, said second attribute containing said sub-field to store said continuation flag and a second sub-field to store an address location on said hardware storage; and if said first attribute is stored at some other location not contiguous with said sequence of attributes, setting said continuation flag to said first value and said second sub-field to an address of another location on said hardware storage where said first attribute is stored.

11. The computer readable medium of claim 8, wherein said convention comprises storing on said hardware storage a valid flag with each of said attributes, wherein said valid flag indicates whether the corresponding attribute has valid data.

12. The computer readable medium of claim 11, further comprising:

receiving a request to delete a second attribute for said first file, wherein said second attribute is contained in said set of attributes corresponding to said first file; and setting said valid flag of said second attribute to indicate that the corresponding bits do not contain valid data.

13. A computer system maintaining attribute information for a plurality of files contained in a file system, said computer system comprising:

a hardware storage storing said plurality of files and a corresponding one of a plurality of sets of attributes corresponding to each of said plurality of files according to a convention which permits addition of new attributes for files of interest, wherein each attribute in said plurality of sets of attributes is contained in a set of attribute types currently supported by said file system, wherein said hardware storage also stores a continuation flag for each attribute in a corresponding sub-field according to said convention, wherein said continuation flag has a first value to indicate that the attributes information for a corresponding file are continued at some other location which is not stored continuous with the attributes of the corresponding file, said continuation flag having a second value otherwise, wherein a first file is stored associated with a first set of attributes according to said convention upon creation of said first file, wherein said first file is contained in said plurality of files and said first set of attributes is contained in said plurality of sets of attributes, wherein each of said first set of attributes has the continuation flag set to said second value;

means for receiving, after said storing, a first attribute of a new attribute type for first file, wherein said first attribute is not contained in said first set of attributes and said new attribute type is not contained in said set of attribute types upon creation of said first file; and means for adding on said hardware storage said first attribute of said new attribute type to said first file according to said convention, whereby said file system on said hardware storage permits addition of new types of attributes not previously supported for files in said file system.

14. The computer system of claim 13, wherein said convention comprises storing on said hardware storage, for each attribute whose said continuation flag is set to said second value, sub-fields indicating a type of the attribute, a length of said attribute and a value of said attribute.

15. The computer system of claim 14, wherein said means for adding operates to overwrite some of said plurality of sets of attributes on said hardware storage to facilitate storing of said first attribute.

16. The computer system of claim 13, wherein said means for adding is operable to provide on said hardware storage an end of row separator and a second attribute as a last attribute before said end of row separator in a sequence of attributes for said first file, said sequence of attributes being contained in said set of attributes corresponding to said first file, said second attribute containing said sub-field to store said continuation flag and a second sub-field to store an address location on said hardware storage, wherein if said first new attribute is stored at some other location not contiguous with said sequence of attributes, said means for adding is further operable to set said continuation flag to said first value and said second sub-field to an address of another location on said hardware storage where said first attribute is stored.

17. The computer system of claim 14, wherein said means for storing is operable to store on said hardware storage a valid flag with each of said attributes, wherein said valid flag indicates whether the corresponding attribute has valid data.

18. The computer system of claim 17, further comprising:

means for receiving a request to delete a second attribute for said first file, wherein said second attribute is contained in said set of attributes corresponding to said first file; and means for setting said valid flag of said second attribute to indicate that the corresponding bits do not contain valid data.

* * * * *

UNITED STATES PATENT AND TRADEMARK OFFICE
CERTIFICATE OF CORRECTION

| | | |
|---|---|---|
| PATENT NO. | : 7,689,634 B2 | |
| APPLICATION NO. | : 11/163819 | |
| DATED | : March 30, 2010 | |
| INVENTOR(S) | : Vivek Agarwal | |

It is certified that error appears in the above-identified patent and that said Letters Patent is hereby corrected as shown below:

On Sheet 18 of 23, in Reference Numeral 140, in Figure 1, line 1, Delete "sysstem" and insert -- system --, therefor.

On Sheet 18 of 23, in Reference Numeral 230, in Figure 2, line 1, after "add" delete "an".

On Sheet 19 of 23, in Reference Numeral 420, in Figure 4, line 1, delete "Separato" and insert -- Separator --, therefor.

In column 7, lines 63-64, in Claim 1, delete "continuous" and insert -- contiguous --, therefor.

In column 8, line 24, in Claim 3, after "said" delete "of".

In column 9, line 3-4, in Claim 7, delete "continuous" and insert -- contiguous --, therefor.

In column 10, line 8, in Claim 13, delete "continuous" and insert -- contiguous --, therefor.

Signed and Sealed this
Fifteenth Day of March, 2011

David J. Kappos
*Director of the United States Patent and Trademark Office*